3,355,625
RECURRENT PULSING SYSTEM WITH SEMICONDUCTOR JUNCTION RECTIFIER IN CAPACITOR DISCHARGE PATH

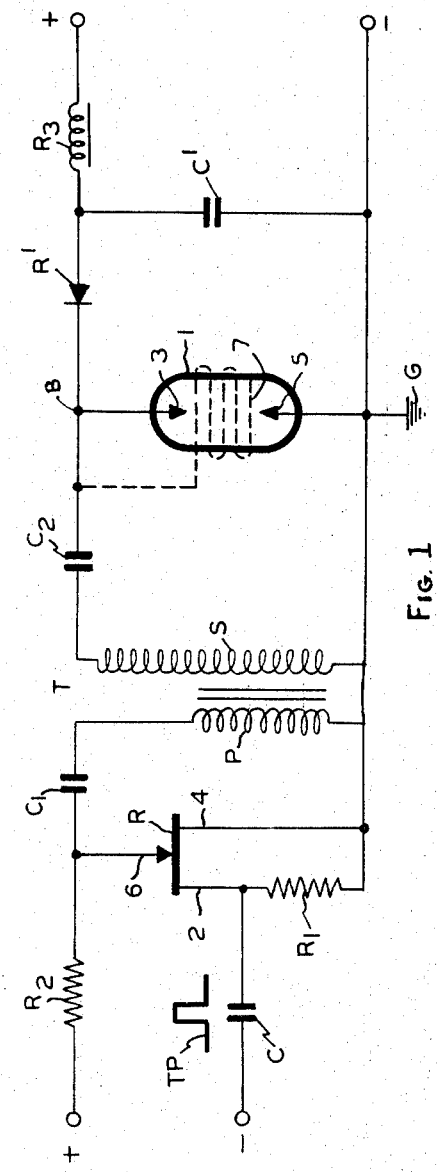
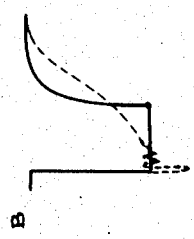
FIG. 1
FIG. 2
INVENTOR
WILLIAM A. WARD

William A. Ward, Norwood, Mass., assignor to United States Scientific Instruments, Inc., Watertown, Mass., a corporation of Massachusetts
Continuation of application Ser. No. 343,735, Feb. 10, 1964. This application May 17, 1966, Ser. No. 550,871
4 Claims. (Cl. 315—200)

ABSTRACT OF THE DISCLOSURE

The invention relates to a high current stroboscopic pulsing system or the like which provides recurrent pulses to an impedance breakdown device from a current supply including a capacitor which is discharged through a semiconductor junction rectifier. The rectifier passes recurrent pulses far in excess of its peak current rating and may hold off triggering pulses far in excess of its hold off voltage rating.

---

This application is a continuation of application No. 343,735, filed Feb. 10, 1964, now abandoned.

The present invention relates to electrical pulsing systems and, more specifically, to electrical impulse discharge circuits as of the type employed in stroboscopy, flash-photography and other electronic pulse modulator systems.

One of the problems that has long plagued the repetitive pulsing art as applied, for example, to flashing gaseous-discharge flashlamps and the like, resides in the limitations on pulsing rate inherent in the recovery or recharging cycle of the voltage sources storing energy for the discharging function. Coupled with this limitation, is the tendency for flashed gaseous-discharge tubes and the like to remain in conduction or "hold-over" during the re-charging.

A principal object of the invention, accordingly, is to provide a new and improved pulsing system that shall not be subject to the above-described limitations but that, to the contrary, shall provide for higher pulsing rates without spurious "hold-over," through the employment of junction-type semi-conductor rectifier devices in a novel and previously unsuspected mode of operation.

A further object is to provide a novel pulsing system of more general utility, also; and other objects will be explained hereinafter and will be more particularly pointed out in the appended claims.

The invention will now be described in connection with the accompanying drawing, FIG. 1 of which is a schematic circuit diagram of a preferred pulsing circuit embodying the invention, shown applied, for illustrative purposes only, to a gaseous-discharge flashlamp; and FIG. 2 is a voltage waveform illustrative of the operation of the circuit of FIG. 1.

Referring to the drawing, a flashlamp load 1, as of the gaseous-discharge tube type (or other normally non-conductive load of blocking impedance adapted to pass a high current when conductive), is shown provided with a terminal anode electrode 3 and a terminal cathode electrode 5, preferably grounded at G, between which voltage stored in a capacitor (or capacitor bank) $C'$ may be discharged, to produce a flash, under the timing control of a trigger pulse applied by the secondary winding S of a trigger transformer T through a capacitor $C_2$, between the electrodes 3 and 5. If desired, an auxiliary trigger electrode (or electrodes) 7 may also be employed to assist in breakdown of the impedance of the gas in the load 1 in response to the trigger pulse applied by the secondary winding S.

In accordance with the invention, the storage capacitor $C'$ is charged from a potential source +, −, through a series impedance, illustrated as an inductance $R_3$, which may provide series-resonance boosting, to a voltage that is below the predetermined voltage necessary to be applied between the electrodes 3 and 5 to effect breakdown of the gas and a flash-discharge through the tube 1. An appropriately timed trigger pulse or repetitive series of trigger pulses controls the time of discharge by adding to the voltage across $C'$ a trigger pulse voltage applied by the said secondary winding S, producing a resultant voltage across the electrodes 3 and 5 that exceeds the before-mentioned predetermined breakdown voltage of the tube 1 and enables a flash discharge therethrough during which the energy stored in capacitor $C'$ is passed to the load as a pulse of current and becomes converted into a flash in the tube 1. The trigger pulse is itself produced in response to input timing pulses TP applied along a negative input line through coupling capacitor C to gate electrode 2 of, for example, a silicon-controlled switching rectifier R. The cathode 4 is connected from the base to the lower terminal of the primary winding P of the trigger transformer T, with a load resistance $R_1$ being connected between electrodes 2 and 4. The anode 6 of the switching device R connects through an energy-storage capacitor $C_1$ to the upper terminal of the primary winding P; the capacitor $C_1$ being charged through resistance $R_2$ from a positive supply terminal +, and discharging through the device R and the primary winding P upon the rendering conductive of the device R in response to the input pulse TP, thereby producing the desired trigger pulse in the transformer T.

Unlike prior-art circuits of this character, at least one PN junction-type semi-conductor rectifier R' is inserted in series between one of the terminals of the main storage capacitor $C'$ and one of the terminals of the load 1, shown as the anode 3, whereby the rectifier is adapted to connect the storage capacitor substantially directly across the load terminals. The poling of R' is such that, when the load 1 is non-conductive, the voltage being developed in charging $C'$ through $R_3$ is isolated from the voltage developed in the trigger transformer secondary winding S. The capacitor $C_2$ serves as a blocking capacitor to prevent interference with the charging of $C'$. At the time that the trigger pulse is applied by winding S to the anode 3, since such pulse is preferably of greater potential than the upper terminal of $C'$, the junction-type semi-conductor rectifier R' is back-biased preventing passage of trigger energy into the supply circuit $C'-R_3$.

While junction-type semi-conductors have heretofore been rated with maximum surge-current and voltage ratings, it has been discovered that this type of semi-conductor device, in the circuit of the present invention, and as distinguished from point-contact semi-conductor devices, has the previously unsuspected properties of being able to pass very high instantaneous peak currents of thousands of amperes, far above their normal surge current ratings; holding off high instantaneous voltages of many thousands of volts, far in excess of rated hold-off voltages; and having very low resistance during instantaneous conduction, far less than that of normal flashtubes during conduction. As an example, the Sylvania type 1N2071 diffuse-junction silicon semi-conductor has a rated peak current of but 6 amperes and a 600 volt hold-off rating. Similarly, the Motorola type MCR808–1 junction-type silicon-controlled rectifier has a rated peak current of only 225 amperes, with a 600 volt hold-off voltage rating; and the Motorola N3286 junction-type rectifier has but a ½ ampere recurrent surge-current rating and a 2.5 ampere non-recurrent surge-current rating.

In circuits of the type disclosed in FIG. 1, however, these very PN junction-type semi-conductor rectifiers, and all other available similar rectifiers tested, have been found to possess the unexpected characteristics that they can actually pass instantaneous high peak currents of thousands of amperes during microsecond pulsing, with pulses of up to 10 microseconds pulse-width, while holding off surge voltages in excess of several thousand volts, up to at least 5,000 volts. For example, in the case of the Motorola MCR808-1 above, the passage of recurrent thousand-ampere pulses at stroboscopic repetition rate exceeds the peak current rating by at least four times, and with the above-mentioned rectifiers having ratings of only a few amperes, the passage of recurrent pulses of the order of one thousand amperes is also greatly in excess of their ratings. Apparently, even the passage of such tremendous microsecond currents does not result in sufficient heating of the junction to produce damage.

Under such operation, the devices R' have also been found to possess a lower resistance than heretofore suspected; of the order of milliohms, as compared with the several ohms resistance of most flashtubes 1, during conduction. This is further to be contrasted with rated resistance values for such semi-conductor devices during their normal operational use in other types of circuits. The said Motorola N3286 device, for example, is rated to produce a 2½ volt drop at 100 ma. of normal operation; which, if the drop is substantially all resistive, would indicate a resistance of 25 ohms—far too high for use in the discharge circuit of FIG. 1 with a flashlamp 1, since it would absorb most of the discharge energy. Yet, in actual practice, with the use shown in the circuit of FIG. 1, an instantaneous avalanche discharge resistance of but milliohms has been discovered, enabling the devices R' to be used remarkably well with such flashtubes.

Through the utilization of the diffuse junction-type semi-conductor rectifier R' in the novel discharge-circuit position described and shown, the voltage developed C' can be considerably lowered from the high values normally used in such flash circuits, with the attendant advantage of a lower time or rate of charging therefor and consequent higher frequency of pulsing operation without hold-over. Far less jitter and sensitivity to manufacturing differences in flashtube characteristics has also been obtained. Thus, in the waveform of FIG. 2, the dash-line curve represents the voltage that would normally result at the anode 3, whereas the solid-line pulse of less width results with the present invention. This less width means that there is less time required after conduction of the tube to recharge the capacitor C' without danger of "hold-over" of discharge in the tube 1; i.e. the maximum repetition rate of flashing can be increased without causing the tube 1 to ionize spontaneously during re-charge of C'.

Typical successfully used values of $C_1$ and $C_2$ with flashtubes of the Edgerton, Germeshausen & Grier type FX6A and rectifiers R' of the said 1N2071 type, are $C_1=0.47$ $\mu$f. and $C_2=10$ $\mu\mu$f. In some tests, though this is not always essential, the value of the trigger voltage was considerably in excess of the approximately one or few-hundred volt potential developed across C'.

Further modifications will occur to those skilled in the art and all such are considered to fall within the spirit and scope of the invention as defined in the appended claims.

What is claimed is:
1. In a high current stroboscopic system and the like, the combination which comprises a normally non-conductive load of blocking impedance including a pair of terminals, said load having impedance break-down means between said terminals adapted to pass a peak current of at least substantially 1000 amperes upon the application of a predetermined voltage across said terminals for rendering said load conductive and reducing the impedance thereof to a low value, means connected between said terminals including voltage-storage and current-supplying means for providing a first voltage less than said predetermined voltage and for supplying to said load a pulse of current each time said load becomes conductive, means for recurrently applying between said terminals, at a stroboscopic repetition rate, a second voltage of a value at least equal to said predetermined voltage for rendering said load conductive recurrently to pass said pulses at said rate, the first-voltage-providing means having means including a PN junction semiconductor rectifier connecting said voltage-storage and current-supplying means substantially directly across said terminals for passing said pulses of current through the PN junction thereof to said load recurrently at said rate, said rectifier being poled to isolate the first and second voltages when the second voltage is applied to said load, said current-supplying means having means for supplying said pulses with a value of the order of 1000 amperes for up to 10 microseconds duration and at least four times the peak current rating of said PN junction rectifier, and said PN junction rectifier having means for producing substantially reduced effective resistance to said pulses and readily passing said pulses recurrently at said rate through the PN junction thereof to said load.

2. In the system of claim 1, said second voltage comprising a short high-voltage pulse, said rectifier having a normal voltage hold-off rating much less than the peak voltage of said high-voltage pulse.

3. In the system of claim 2, said peak voltage being of the order of at least 1000 volts, said current rating being no more than of the order of one hundred amperes and said voltage rating being no more than of the order of one hundred volts.

4. In the system of claim 1, said load being a flashtube, said rectifier having a normal forward resistance rating of the order of at least several ohms and having a resistance to said pulses of the order of milliohms.

References Cited

UNITED STATES PATENTS

| | | | |
|---|---|---|---|
| 3,134,048 | 5/1964 | Wolfframm et al. | 315—241 |
| 3,154,693 | 10/1964 | Wiley | 307—88.5 |
| 3,189,790 | 6/1965 | Nuckolls | 315—289 |

OTHER REFERENCES

Semiconductor Rectifier Components Guide, General Electric Rectifier Components Dept., Auburn, N.Y., 1962, pp. 94 and 96.

Thomas, L. H.: Non-Linear Diode Logical Circuits. Appearing in "IBM Technical Disclosure Bulletin," vol 1, No. 6, April 1959, pp. 27-30.

JAMES D. KALLAM, *Primary Examiner.*

JOHN W. HUCKERT, *Examiner.*

D. O. KRAFT, *Assistant Examiner.*